(No Model.) 2 Sheets—Sheet 1.
W. S. PARKER.
MOLD.
No. 576,277. Patented Feb. 2, 1897.
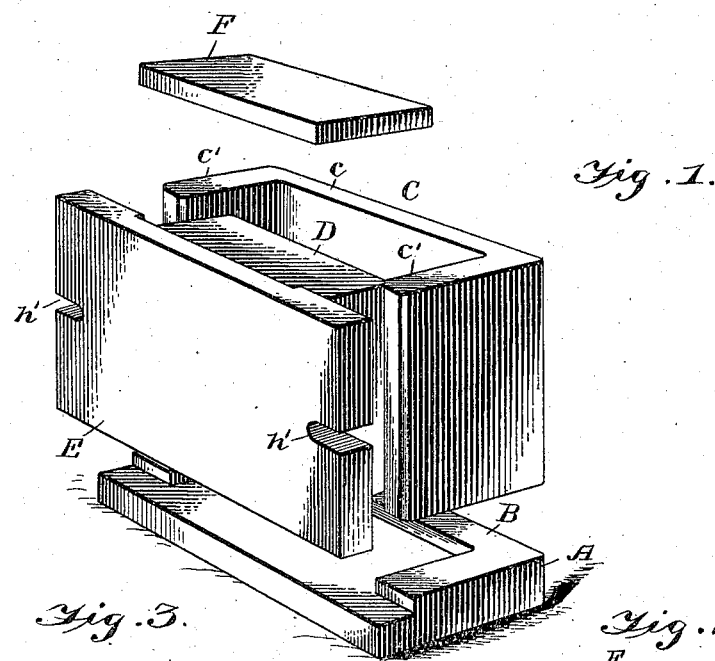
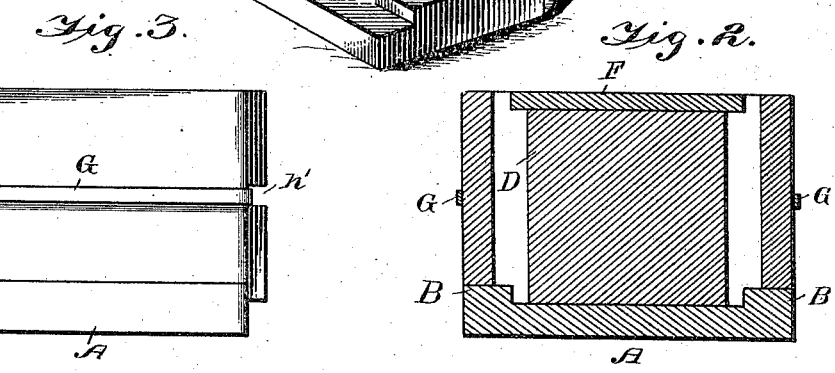
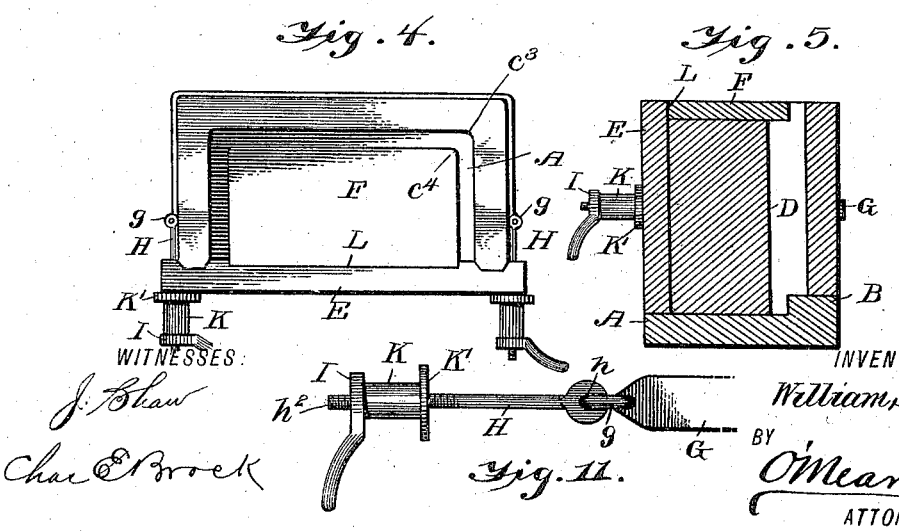
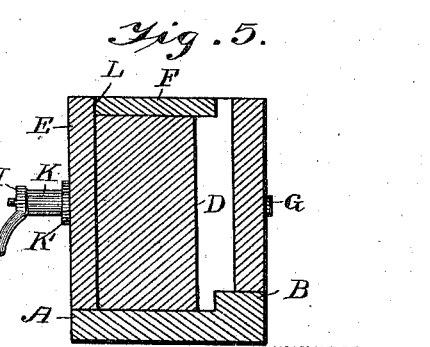
WITNESSES:
J. Shaw
Chas. E. Brock
INVENTOR
William S. Parker,
BY O'Meara & Co.
ATTORNEYS
THE NORRIS PETERS CO., PHOTO-LITHO., WASHINGTON, D. C.

(No Model.) 2 Sheets—Sheet 2.
W. S. PARKER.
MOLD.
No. 576,277. Patented Feb. 2, 1897.
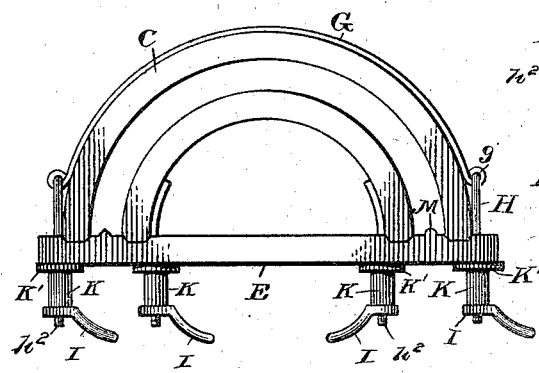
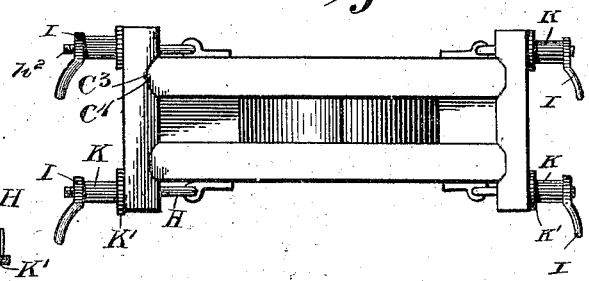
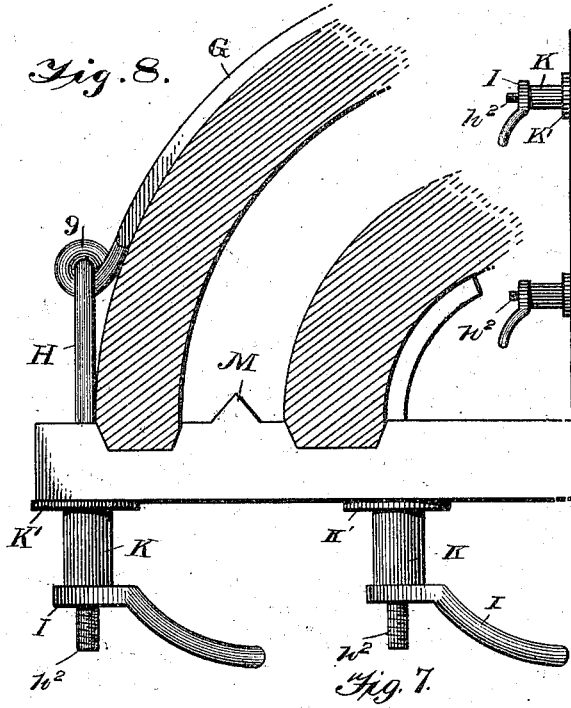
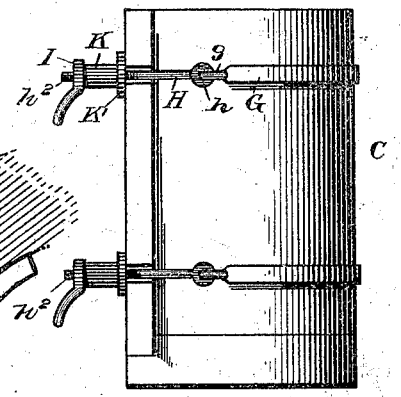
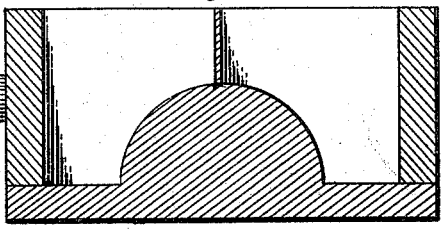
WITNESSES:
J. Shaw.
Chas. E. Brock.
INVENTOR
William S. Parker,
BY
O'Meara & Co.
ATTORNEYS
THE NORRIS PETERS CO., PHOTO-LITHO., WASHINGTON, D. C.

UNITED STATES PATENT OFFICE.

WILLIAM SINK PARKER, OF AUSTIN, TEXAS, ASSIGNOR OF TWO-THIRDS TO OTTO BERGSTROM AND ROBERT M. ARMSTRONG, OF SAME PLACE.

MOLD.

SPECIFICATION forming part of Letters Patent No. 576,277, dated February 2, 1897.

Application filed March 25, 1896. Serial No. 584,866. (No model.)

*To all whom it may concern:*

Be it known that I, WILLIAM SINK PARKER, residing at Austin, in the county of Travis and State of Texas, have invented a new and useful Improvement in Molds, of which the following is a specification.

This invention relates generally to molds, and particularly to an improved mold for forming the sections of the culvert and burial-vault shown, described, and claimed in the applications which I have filed.

The object of the invention is to provide a mold which shall be exceedingly cheap and simple, one which shall consist of very few parts, and one which can be quickly and easily assembled and separated.

Another object is to provide a mold the principle of which can be utilized for making the semicircular or rectangular sections, and the principles of this mold can also be applied to the manufacture of the end blocks or bricks for the culvert-wall.

Another object is to provide cheap, simple, and easily-operated means for securing the various portions of the mold together.

A still further object is to provide a mold which can be used for forming the rabbeted ends of the sections; and a still further object is to provide a mold which can be employed in the manufacture of either concrete or earthenware sections.

With these objects in view my invention consists, broadly, in a base and body portion, a former-block, and face-plate, and means for securely locking the said parts together.

The invention consists also in constructing the base with the raised portions to provide a rabbet in the end of the molded section.

The invention consists also in arranging a top piece upon the former-block, which top is of an area greater than the said former-block, whereby the rabbet will be formed in the upper end of the molded section.

The invention also consists in certain details of construction and novelties of combination, all of which are fully shown in the drawings, set forth in the description, and pointed out in the appended claims.

In the drawings forming a part of this specification, Figure 1 is a perspective view showing the various parts of my mold detached, but showing their relative arrangement when assembled. Fig. 2 is a vertical longitudinal section. Fig. 3 is a rear view. Fig. 4 is a top plan view. Fig. 5 is a transverse vertical section. Fig. 6 is a top plan view of a slightly-modified form of mold. Fig. 7 is a sectional view of said mold. Fig. 8 is a detail sectional view showing one side of a mold for making semicircular sections with plain joints. Fig. 9 is a top plan view of said mold. Fig. 10 is a side view thereof, and Fig. 11 a detail.

As before stated my mold is adapted for the use in the manufacture of either semicircular, segmental, or rectangular shaped sections, and in the drawings I have shown all forms and in the description shall refer to the parts as though they were identical in construction, it being obvious that so far as the principle of the invention is concerned the difference in their shape involves no change whatever in their operation.

In forming a mold in accordance with my invention I employ a base A, which is made the desired size and shape and may be of iron, brass, wood, or any suitable material.

The upper face of the base is provided with the raised portion B, which extends inwardly a short distance around the side and rear edges of the base, and resting upon this raised portion is the body portion C of mold comprising the back $c$ and the sides $c'$, said sides and back being of a thickness somewhat less than that of the raised portion, as clearly shown.

The base and body of the mold could be made integral, if desired, but in practice I prefer to make them separate, as by this arrangement any desired length or height of body can be used with the proper shaped base.

Resting upon the base A and within the body C, I arrange a former-block D, said former-block being shaped to correspond with the shape of the body. By this it is meant that in case the body is semicircular in shape the former-block will also be made semicircular in shape. The former-block is made somewhat smaller than the body, thus allowing ample room or space between the former-block and walls of the body in which to pack or press the concrete, terra-cotta, or material to be molded.

In connection with the former-block and body portions I employ a face-plate E, and upon the former-block is arranged a top piece F, which is somewhat larger in area than the top of former-block, so that the edges of said top piece project beyond the sides and back of the former-block a distance equal to the distance which the raised portion of the base projects inwardly beyond the interior walls of the body portion. The face-plate rests upon the forward portion of the base and holds the top piece in place upon the former-block, and in order to securely lock said parts in place I employ one or more locking-bands G, which pass around the exterior of the body portion of mold and terminate at their forward ends in loops or eyes $g$, to which are connected bolts H, having eyes $h$ at their inner ends to engage the eyes or loops $g$, which bolts pass through notches or recesses $h'$, formed in the edges of the face-plate, and the forward ends of these bolts are threaded, as shown at $h^2$, to receive the handle-nut I, and in order to hold said handle-nut a sufficient distance away from the face-plate I arrange a spacing-sleeve K upon the bolt and beneath the handle-nut, the inner end of said spacing-sleeve bearing upon the washer K', thus taking the strain or pressure away from the edges of the face-plate.

As thus far described it will be seen that I provide a mold comprising a base, a body portion, a former-block, and a face-plate and top piece, all of which are securely locked together by means of the locking-bands, bolts, and handle-nuts.

It will also be understood that the base is constructed with an inwardly-projecting raised portion and that the top piece is arranged upon the former-block and against the face-plate, the edge of said face-plate projecting outwardly beyond the sides of the former-block, thus providing oppositely-disposed rabbets or overlapping edges at opposite ends of the mold-section.

In case it is desired to lock the parts together in a particularly strong manner the face-plate may be recessed, as shown at L, in order to receive the forward edges of the body portion and former-block. In case it is desired to mold culvert pipe-sections with longitudinal grooves, I make suitable provision therefor by placing a bead upon the face-plate, as clearly shown at M, Fig. 9.

Now in operation a number of base-pieces are set in line, the proper body, former-block, and face-plate are assembled and securely locked by locking-bands, bolts, and handle-nuts on the first base-piece in the line. A portion of the material to be molded is then placed in the mold and well rammed and this process repeated until the mold is filled, the top piece being set in place upon the former-block before the packing is completed. The body portion and former-block and face-plate are then immediately unlocked and separately moved to the next base-piece, leaving the molded section on the base-piece a sufficient time to dry before being handled.

It will be seen by the foregoing that a number of base-pieces are required for each body portion, former-block, and face-plate, so as to employ the operator steadily.

In Figs. 6 and 7 I have shown a top plan and sectional view of a mold for making blocks or bricks for the end walls of my culvert, the principle embodied in this mold being identical with that before described.

It will be noticed that in the rectangular form of molds, Fig. 4, the inner edges of the mold are made curved instead of square, as shown at $c^3$, and the corners of the top portion are correspondingly rounded, as shown at $c^4$, the purpose of which is to make a better and stronger article.

It will thus be seen that I provide an exceedingly cheap, simple, and efficient form of mold for the purpose described, one which can be quickly and easily put together and taken apart, and one which will effectively provide the oppositely-arranged rabbeted edges at the opposite ends of the molded section.

Having thus described my invention, what I claim as new, and desire to secure by Letters Patent, is—

1. In a mold for the purpose described, the combination with the base, having an inwardly-projecting raised portion, of the body portion, the former-block and face-plate, and means for connecting said parts, substantially as shown and described.

2. In a mold for the purpose described, the combination with the base, having an inwardly-projecting raised portion, the body portion, the face-plate, the top piece, and the former-block; said top piece resting upon the former-block and projecting outwardly over the sides thereof, but not in contact with the body portion; and means for uniting all of said parts, substantially as shown and described.

3. In a mold for the purpose described, the combination with the base, having a raised portion, of the body portion, the former-block, the face-plate, and top piece; said top piece being of an area greater than the former-block, but not in contact with the body portion; the locking-band and bolt, the spacing-sleeve and handle-nuts, all arranged substantially as shown and described.

4. In a mold for the purpose described, the combination with the base, constructed as described, of the body portion, the interior corners of which are rounded, the former-block, the corners of which are rounded or curved, the face-plate having recesses to receive the edges of the body portion and former-block, the locking-band and bolts, the spacing-sleeve and handle-nuts, and the top piece resting upon the former-block, but not in contact with the body portion, said top piece being of an area greater than the former-block, substantially as shown and described.

WILLIAM SINK PARKER.

Witnesses:
 THOS. T. ARMSTRONG,
 F. M. COVERT.